2,835,639

AQUEOUS EMULSIONS FOR THE PREPARATION OF WATER REPELLENT DRESSINGS AND PROCESS OF TREATING FIBROUS MATERIALS THEREWITH

Gustav Widmer, Basel, Willy Fatzer, Bottmingen, Wilhelm Geigy, Binningen, Wilhelm Kraus, Basel, and Armin Hiestand, Binningen, Switzerland, assignors to Ciba Limited, Basel, Switzerland, a Swiss firm No Drawing. Application June 28, 1954
Serial No. 439,894

Claims priority, application Switzerland August 11, 1949

14 Claims. (Cl. 260—21)

This application relates to aqueous emulsions for the preparation of water repellent dressings, to a process for impregnating fibrous materials, and to the impregnated material and is a continuation-in-part of application Ser. No. 176,518, filed July 28, 1950 (now abandoned).

It has been found that aqueous emulsions of the oil-in-water type, which may be used for the production of water-repellent dressings, are very valuable if they contain in the oily phase (a) a water-insoluble methylol compound of melamine in which the oxygen atom of at least one methylol group is linked to a non-aromatic acid radical having more than 8 carbon atoms and (b) another water repellent waxy compound, and if they contain in the aqueous phase (c) an emulsifying agent consisting of a water-soluble, synthetic, high molecular substance forming highly viscous solutions, the constituents of said emulsions being present in the relative proportions by weight between the ranges: aqueous phase to oily phase 55:45 to 80:20, component (a) to component (b) 5:1 to 1:19.

The said water-insoluble methylol compound, which may be used as component (a), is advantageously a compound in which at least one but not all the methylol groups are esterified with an aliphatic or cyclo-aliphatic carboxylic acid containing more than 8 carbon atoms and having the remaining methylol groups at least partially etherified with a lower aliphatic alcohol.

Among the aliphatic or cycloaliphatic carboxylic acids containing more than 8 carbon atoms there may be mentioned, for example, pelargonic acid, lauric acid, myristic acid, or palmitic acid, and advantageously fatty acids containing more than 17 carbon atoms such as stearic acid, oleic acid, cerotic acid, fatty acid second runnings (that is, a mixture of carboxylic acids containing more than 18 carbon atoms as obtained by the fractional distillation of oxidation products of paraffin wax) or colophony.

The aforesaid methylol-melamine esters derived from such carboxylic acids can be obtained by methods known per se, for example, by heating the carboxylic acids, if necessary under reduced pressure, with a methylol-compound of melamine containing about 4–6 methylol groups of which about 2–6 are etherified with a lower aliphatic alcohol, such as methyl alcohol or butyl alcohol. In their turn, these methylol-ethers can be obtained in known manner, for example, by reacting methylol-melamine with the lower alcohol in the presence of a small quantity of mineral acid.

The other water repellent compound, which is used as component (b) in the emulsions of this invention, is designated in the description as "other water repellent waxy compound." This term includes natural or synthetic waxes, i. e. esters of higher monobasic acids with higher mono- or di-valent alcohols, and also wax-like compounds, i. e. mixtures of solid hydrocarbons. These two classes of compounds may be named waxy compounds, because they have similar properties. Waxy compounds suitable for use are vegetable waxes, such as carnauba, japan, candelilla, palm and ouricuri; insect waxes, such as beeswax, petroleum waxes such as paraffin, microcrystalline and ceresin waxes, synthetic waxes, such as Acrowax, Armorwax, synthetic paraffins, and Opalwax. Blends of these waxes are also desirable. For example, carnauba wax in paraffin raises the melting point of paraffin considerably and in some cases gives results similar to pure carnauba. Advantageously there are used waxy compounds which are soluble in the methylol melamine ester (component (a)) at a raised temperature, and especially there is made use of paraffin wax.

The emulsifying agents, which are present as component (c) in the emulsions of the present invention, are water soluble, synthetic, high molecular substances forming highly viscous solutions. Such substances are, for example, polyvinyl alcohol, methyl-cellulose, salts of polymerisation products containing carboxyl groups, for example, salts of copolymers of unsaturated mono- or polycarboxylic acids or anhydrides thereof with other substances capable of polymerising, for example, the ammonium salt of a copolymer of maleic anhydride and styrene or salts of cellulose ethers of oxycarboxylic acids, for example, the ammonium salt of carboxy methyl-cellulose. These substances giving highly viscous solutions are preferably used together with anion active emulsifying agents, for example, fatty alcohol sulfonates, condensation products of naphthalene sulfonic acids and formaldehyde, neutralized with an aqueous solution of sodium hydroxide, sodium $\mu$-heptadecyl-N-benzyl-benzimidazole disulfonate, or cation active emulsifying agents, such as 4-stearyl aminobenzene-1-trimethyl-ammonium methyl sulfate, or non-ionogenic emulsifying agents, such, for example, as an emulsifying agent prepared by condensing a mixture of octadecyl alcohol and cetyl alcohol with ethylene oxide.

It is of advantage to use in the present invention polyvinyl alcohol having a viscosity according to Ostwald $$\frac{\text{specific } \eta}{C}=0.1$$

(an aqueous solution of 0.3 percent at 20° C.) and sodium $\mu$-heptadecyl-N-benzyl-benzimidazole disulfonate as an emulsifying agent. The letter "$\eta$" in the above equation means the viscosity and "C" represents the number of grams of dissolved substance per liter of solution. The specific viscosity is the relative viscosity minus 1, where the relative viscosity is equal to the viscosity of the solution divided by the viscosity of the solvent.

For increasing their stability a weak base, for example, triethanolamine, morpholine or advantageously ammonia, may be added to the emulsions.

It has been found that it is of great importance that the components in the emulsions of the invention are present between certain ranges in order that the emulsions are stable and the water repellent dressings produced withstand washing operations. The ranges of the aqueous phase of the emulsions and their oily phase (i. e. melamine-ester and other waxy compound taken together) should lie between 55:45 and 80:20). Emulsions which contain substantially more than about 45 percent of oily phase are difficult to obtain and are not stable enough for practical purposes. As it is desirable to produce concentrated emulsions, they should not contain substantially less than 20 percent of oily phase. A preferred relationship is 66 percent aqueous phase to 34 percent oily phase, i. e. about 2:1.

Also the relationship between the two components (a) and (b) of the oily phase is important. The ranges between component (a) and component (b) should lie between 5:1 to 1:19. There are useful mixtures of 5 parts of the methylol melamine ester and 95 parts of paraffin wax, 10 parts of ester and 90 parts of wax, 25 parts of ester and 75 parts of wax, 50 parts of ester and 50 parts of wax, 75 parts of ester and 25 parts of wax, and about 83 parts of ester and 17 parts of wax. If the content of the wax is substantially lower than 17 percent of the oily phase, the water repellent dressings are no longer of good quality, and if the content of the methylol-melamine ester is too low, i. e. substantially less than 5 percent of the oily phase the wash fastness of the water repellent dressing is also impaired. Between the two limitative ranges 5:1 and 1:19 of the components (a) and (b) the ranges may be of any value. A relationship of 1:1 however is preferred, i. e. equal parts of the two components are preferably used.

Furthermore it has been found that the quantity of emulsifying agents used is important. It is clear that in order to obtain dressings of good fastness to washing operations the quantity of emulsifying agents should be as low as possible. On the other hand stable emulsions can only be produced with a reasonable quantity of such an agent, which also depends on the quantity of oily phase which must be emulsified. The quantity of the water soluble, synthetic, high molecular substance may vary from about 0.5 to about 6 percent and preferably from 2 to 4 percent of the total weight of the emulsion, and that of the additionally used emulsifying agent from 0.0 to about 5.0 percent and preferably 1.5 to 4.0 percent.

In order to prepare the impregnating bath from the above described concentrated emulsions they may be diluted by adding 5 to 20 parts by weight of warm water and a hardening catalyst is added to the bath. Alternatively the catalyst may be previously dissolved in the water used for dilution.

As hardening catalyst potentially acid catalysts or acid catalysts may be used.

As potentially acid catalysts there may be used ammonium salts of strong acids, for example, ammonium thiocyanate, advantageously ammonium chloride, or zinc nitrate, zinc chloride or magnesium chloride, and as acid catalysts, for example, hydrochloric acid, phosphoric acid, aluminium chloride and advantageously formic acid, or mixtures of these two kinds of catalysts.

The fibrous material may be impregnated at ordinary temperature, but the impregnation is advantageously carried out at a bath temperature of 40–80° C. by the usual methods by immersion, advantageously with subsequent centrifuging or squeezing to remove an excess of impregnating agent. The process is advantageously carried out so that the increase in weight amounts to 60–100 percent calculated on the dry weight of the fibrous material.

The impregnated fibrous material is then dried by the methods usual in improving textiles, and then subjected to a heat treatment, which as a rule requires a longer duration at lower temperatures than at higher temperatures, and which is preferably carried out for about 5–15 minutes at a temperature of about 125–140° C. Preferably the impregnation is done in such a manner that the impregnated fabrics contain about 2 to 4 percent of their weight of the water repellent substances.

After this treatment it is not necessary to wash the fabric, because on the one hand, no unpleasant odours arise and, on the other, resistance to water, particularly the resistance to penetration by water and the resistance to surface wetting, i. e. water repellency, is already present in high degree. The resistance to penetration is measured by the Heermann method, i. e. the hydrostatic pressure test, and the water repellency by the droplet shedding test. As fibrous materials which can be impregnated there may be mentioned natural or artificial fibrous materials, more especially such of which the fibers are free from organically bound sulfur, such as yarns, or fabrics, for example, of cotton, silk, cellulose esters, regenerated cellulose, polyamide fibers or paper.

The fastness properties of dyeings are not affected by this treatment. Indeed, the fastness to light of certain dyeings is even increased thereby.

The following examples illustrate the invention, the parts and percentages being by weight:

*Example 1*

10 parts of an aqueous solution of about 10 percent strength of polyvinyl alcohol having a viscosity of $$\frac{\eta \text{ specific}}{C}=0.1$$

(an aqueous solution of 0.3 percent strength at 20° C.) are heated while stirring in a vessel provided with stirring mechanism to a temperature of about 70° C. After 1.5 parts of an aqueous ammonia solution of about 25 percent strength has been added, 10 parts of a homogeneous melt heated at about 90° C. consisting of 5 parts of paraffin wax having a melting point of 50° C. and 5 parts of an ester from methylol-melamine methyl ether and stearic acid, the preparation of which is described below, are poured in, and the whole is stirred until an emulsion is formed. 8.3 parts of water having a temperature of about 70° C. are then introduced while slowly stirring. From the resulting mass a finely dispersed stable emulsion is obtained by means of a homogenizing machine of the kind known in the art.

The ester of methylol-melamine methyl ether and stearic acid is obtained in a manner analogous to the esters described in British Patent No. 611,012, but a methylol-melamine methyl ether is used as starting-material which differs from the methylol-melamine ether described in the last paragraph of Example 1 of the aforesaid patent only in that the filtered syrup obtained after the condensation and concentrated to about 99 percent strength is not taken up in benzene but is filtered hot in order to remove residual salts. (This methylol-melamine methyl ether is used as starting material for making the esters of methylol-melamine mentioned in the examples.)

1 part of the resulting methylol-melamine methyl ether is heated with 1.3 parts of stearic acid under a pressure of about 30 mm. of mercury at about 200° C. until the acid number of the product has fallen below 10, and preferably to 5–8. The product has a softening point below 50° C. as measured by the Kraemer-Sarnow method and is soluble with heat in all proportions in paraffin wax.

Instead of the ester used above there may be used for example the following ester:

An ester from 1 part of methylol-melamine methyl ether and 0.65 part of stearic acid, or an ester from 1 part of methylol-melamine methyl ether, 0.78 part of colophony and 0.63 part of stearic acid.

Instead of the polyvinyl alcohol solution, there may be used, for example, 10 parts of an ammoniacal solution of 10 percent strength of copolymer of styrene and maleic anhydride or 20 parts of an ammoniacal solution of 5 percent strength of carboxy methyl-cellulose.

In addition to the polyvinyl alcohol solution there may be used, for example, 0.2 part of sodium $\mu$-heptadecyl-N-benzyl-benzimidazole disulfonate or an emulsifying agent obtained by the condensation of a mixture of octadecyl and cetyl alcohols with ethylene oxide, or 4-stearyl-amino-benzene-1-trimethyl ammonium methyl sulfate or a mixture of 0.2 part of sodium-$\mu$-heptadecyl-N-benzyl-benzimidazole disulfonate and 0.3 part of a condensation product from naphthalene sulfonic acid and formaldehyde neutralized with an aqueous solution of sodium hydroxide. In this way the stability of the bath is improved.

*Example 2*

Cotton gabardine is treated on the foulard until the increase in weight amounts to about 100 percent (calculated on the dry weight of the fabric) with a bath having a temperature of about 50° C., which contains 9 parts of water, 0.1 part of ammonium chloride, 0.05 part of concentrated formic acid and 1 part of an emulsion obtained as described in Example 1.

The fabric is then dried, for example, by heating for ½ hour at about 90° C., and hardening is then brought about by heating for 15 minutes at 125–140° C.

Unwashed and washed samples of the material exhibit a very good droplet shedding effect. The resistance to water as measured by the Heermann method is hardly affected by washing.

Instead of cotton gabardine there may be used, for example, a fabric of regenerated cellulose, a fabric of a cellulose ester, a fabric of polyamide fibers or paper.

*Example 3*

0.2 part of sodium-μ-heptadecyl-N-benzyl-benzimidazole disulfonate, 0.3 part of a condensation product from naphthalene sulfonic acid and formaldehyde neutralized with an aqueous solution of sodium hydroxide are heated to about 70° C. while stirring, with 10 parts of an aqueous solution of about 10 percent strength of polyvinyl alcohol. 0.15 part of an aqueous ammonia solution of about 25 percent strength is then added to the solution, and 10 parts of a homogeneous melt heated at about 90° C. and consisting of 5 parts of paraffin wax and 5 parts of a mixed ester of methylol-melamine methyl ether, technical stearic acid and fatty acid second runnings, prepared as described below, are poured into the solution, and the mixture is stirred until an emulsion is formed. Then, a further 1.35 parts of the above ammonia solution and 8 parts of water having a temperature of about 70° C. are added, and then the emulsion is homogenized.

In the manner described in Example 2 a cotton fabric is treated in a bath having a temperature of about 65° C. and containing the above emulsion, and the fabric is dried and hardening is brought about.

Before and after washing the treated material exhibits a very good droplet shedding effect. The resistance to water as measured by the method of Heermann is hardly affected by washing.

The mixed ester of methylol-melamine methyl ether, technical stearic acid and fatty acid second runnings used in the above example was prepared as follows:

1000 parts of the methylol-melamine methyl ether described in Example 1 are stirred under reduced pressure at 195–200° C. with 368 parts of commercial stearic acid until the acid number of the reaction product has fallen to about 2. After cooling to about 90° C., 1200 parts of fatty acid second runnings having an acid number of 184, an ester number of 6.5, a saponification number of 190.5 and melting at 47–49° C. are added while stirring, and the mixture is heated under a reduced pressure initially of 20–30 mm. and later of 15 mm. of mercury at 195–200° C. until the acid number of the product is less than 3.

*Example 4*

1.945 parts of the aqueous solution, described below, of the condensation product from cresol, 2-naphthol-6-sulfonic acid, an alkali sulfite and formaldehyde are heated to about 70° C. with 0.2 part of sodium-μ-heptadecyl-N-benzyl-benzimidazole disulfonate and 10 parts of an aqueous solution of about 10 percent strength of polyvinyl alcohol. After the addition of 0.15 part of an ammonia solution of about 25 percent strength, 10 parts of a homogeneous melt having a temperature of about 90° C. and consisting of 5 parts of paraffin wax and 5 parts of the stearic acid ester described in the third paragraph of Example 1 are poured in while stirring. The mixture is stirred until an emulsion is formed, and then with further stirring 1.35 parts of the above ammonia solution and 6.4 parts of water heated at about 70° C. are added.

In the manner described in Example 2 a cotton fabric is treated in a bath heated at about 65° C. and containing the above emulsion, and the treated fabric is dried, and hardening is brought about. Before and after washing the material exhibits a very good droplet shedding effect. The resistance to water as measured by the Heermann method is hardly affected by washing.

The aqueous solution of the condensation product used in this example is prepared as follows:

A mixture of 40 parts of water, 5.85 parts of anhydrous disodium sulfite, 10.9 parts of an aqueous formaldehyde solution of 36.8 percent strength and 13.25 parts of phenol-free cresol having a content of meta-cresol exceeding 50 percent is stirred in a closed vessel for 4½ hours at 120–125° C. After cooling to about 60° C., a mixture of 3.3 parts of dry commercial 2-naphthol-6-sulfonic acid, 0.975 part of anhydrous disodium sulfite, 1.8 parts of the above formaldehyde solution, 8.46 parts of water and 2.65 parts of an aqueous sodium hydroxide solution of 29 percent strength is added. The mixture is stirred in a closed vessel for 3 hours at 110–115° C. After cooling, the reaction mixture is diluted with its own weight of water, whereby about 170 parts of an aqueous solution of the condensation product are obtained.

*Example 5*

10 parts of a homogeneous melt heated at about 90° C. and consisting of 5 parts of paraffin wax and 5 parts of the stearic acid ester described in the third paragraph of Example 1 are emulsified in an emulsifying solution heated at about 70° C., which contains 0.8 part of an emulsifying agent obtained by the condensation of 1 mol of olein alcohol with 80 mols of ethylene oxide, 2 parts of water, 0.3 part of a condensation product from naphthalene sulfonic acid and formaldehyde neutralized with an aqueous solution of sodium hydroxide, 8 parts of a solution of about 10 percent strength of polyvinyl alcohol and 0.15 part of an aqueous ammonia solution of about 25 percent strength. After the addition of 1.35 parts of the above ammonia solution and 5 parts of water having a temperature of about 70° C., the emulsion is homogenized.

In the manner described in Example 2 a cotton fabric is treated in a bath at about 65° C. containing the above emulsion, and the treated fabric is dried and hardening is brought about. The treated fabric before and after washing shows a very good droplet shedding effect. The resistance to water as measured by the Heermann method is hardly affected by washing.

*Example 6*

An emulsion is prepared as described in Example 5, but there are used only 2.0 parts of the aqueous solution of polyvinyl alcohol, or 2.0 parts of the solution of the copolymer from styrene mentioned in Example 1 and maleic anhydride or 2.0 percent of the solution of the carboxy-methyl cellulose respectively. (The difference to 8 parts was made up with 6 parts of water.) There may also be used for the preparation of the emulsion 5 or 10 parts of the solutions of the above named emulsifying agents.

*Example 7*

Example 5 was repeated, but there were used 5 parts of an ester from methylated methylol-melamine and lauric acid prepared in the same manner as the ester described in Example 1.

*Example 8*

Example 5 was repeated, but the paraffin wax was replaced by the same quantity of beeswax or a mixture of equal parts of beeswax and paraffin wax.

*Example 9*

Example 5 was repeated, but the mixture of 5 parts of the ester from methylated methylol melamine and stearic acid and 5 parts of paraffin wax was replaced by 10 parts of the following mixtures:

(a) 95 percent paraffin wax, 5 percent ester (ratio 19:1)

(b) 91.6 percent paraffin wax, 8.4 percent ester (ratio 11:1)
(c) 88.9 percent paraffin wax, 11.1 percent ester (ratio 8:1)
(d) 83.4 percent paraffin wax, 16.6 percent ester (ratio 5:1)
(e) 75 percent paraffin wax, 25 percent ester (ratio 3:1)
(f) 25 percent paraffin wax, 75 percent ester (ratio 1:3)
(g) 16.6 percent paraffin wax, 83.4 percent ester (ratio 1:5)

When a ratio of paraffin wax to melamine ester of 1:11 or 1:19 was used, the resulting water repellent dressings did not have the same good qualities as when emulsions were used as described above.

What is claimed is:

1. A concentrated aqueous emulsion of the oil-in-water type suitable for the preparation of an aqueous impregnating bath, which emulsion contains in the oily phase (a) a water-insoluble methylol compound of melamine in which the oxygen atom of at least one methylol group is linked to a non-aromatic acid radical having more than 8 carbon atoms and (b) a water repellent wax selected from the group consisting of paraffin wax and beeswax, said emulsion containing in the aqueous phase (c) an emulsifying agent consisting of a water soluble, synthetic, high molecular substance forming highly viscous solutions, the constituents of said emulsion being present in the relative proportions by weight between the ranges: aqueous phase to oily phase 55:45 to 80:20, component (a) to component (b) 5:1 to 1:19 and component (c) 0.5 to 6 percent of the total weight of the emulsion.

2. Process for producing on fibrous materials a water-repellent dressing resistant to washing, wherein the fibrous material is treated in an aqueous bath obtained by diluting with water an emulsion claimed in claim 1 and adding a hardening catalyst, and in which process the treated material is dried and subjected to a heat treatment.

3. A concentrated aqueous emulsion of the oil-in-water type suitable for the preparation of an aqueous impregnating bath, which emulsion contains in the oily phase (a) a water-insoluble methylated methylol melamine in which the oxygen atom of at least one methylol group is linked to a fatty acid radical containing at least 17 carbon atoms and (b) paraffin wax, said emulsion containing in the aqueous phase (c) an emulsifying agent consisting of a water soluble, synthetic, high molecular substance forming highly viscous solutions, the constituents of said emulsion being present in the relative proportions by weight between the ranges: aqueous phase to oily phase 55:45 to 80:20, component (a) to component (b) 5:1 to 1:19 and component (c) 0.5 to 6 percent of the total weight of the emulsion.

4. Process for producing on fibrous materials a water-repellent dressing resistant to washing, wherein the fibrous material is treated in an aqueous bath obtained by diluting with water an emulsion claimed in claim 3 and adding a hardening catalyst, and in which process the treated material is dried and subject to a heat treatment.

5. A concentrated aqueous emulsion of the oil-in-water type suitable for the preparation of an aqueous impregnating bath, which emulsion contains in the oily phase (a) a water-insoluble methylated methylol melamine in which the oxygen atom of at least one methylol group is linked to the stearic acid radical and (b) paraffin wax, said emulsion containing in the aqueous phase as an emulsifying agent (c) polyvinyl alcohol, the constituents of said emulsion being present in the relative proportions by weight between the ranges: aqueous phase to oily phase 55:45 to 80:20, component (a) to component (b) 5:1 to 1:19 and component (c) 0.5 to 6 percent of the total weight of the emulsion.

6. Process for producing on fibrous materials a water-repellent dressing resistant to washing, wherein the fibrous material is treated in an aqueous bath obtained by diluting with water an emulsion claimed in claim 5 and adding a hardening catalyst, and in which process the treated material is dried and subjected to a heat treatment.

7. A concentrated aqueous emulsion of the oil-in-water type suitable for the preparation of an aqueous impregnating bath, which emulsion contains in the oily phase (a) a water-insoluble methylated methylol melamine in which the oxygen atom of one methylol group is esterified with stearic acid and another is esterified with colophonium acid and (b) paraffin wax, said emulsion containing in the aqueous phase as an emulsifying agent (c) polyvinyl alcohol, the constituents of said emulsion being present in the relative proportions expressed in parts by weight: aqueous phase to oily phase 66:34, component (a) to component (b) 17:17 and component (c) 3.4 percent of the total weight of the emulsion.

8. Process for producing on fibrous materials a water-repellent dressing resistant to washing, wherein the fibrous material is treated in an aqueous bath obtained by diluting with water an emulsion claimed in claim 7 and adding a hardening catalyst, and in which process the treated material is dried and subjected to a heat treatment.

9. A concentrated aqueous emulsion of the oil-in-water type suitable for the preparation of an aqueous impregnating bath, which emulsion contains in the oily phase (a) a water-insoluble methylated methylol melamine in which the oxygen atom of one methylol group is esterified with stearic acid and another is esterified with a fatty acid second running and (b) paraffin wax, said emulsion containing in the aqueous phase as emulsifying agents, (c) polyvinyl alcohol, (d) sodium $\mu$-heptadecyl-N-benzylbenzimidazole disulfonate and (e) a condensation product from naphthalene sulfonic acid and formaldehyde neutralized with sodium hydroxide, the constituents of said emulsion being present in the relative proportions expressed in parts by weight: aqueous phase to oily phase 66:34, component (a) to component (b) 17:17, component (c) 3.4 percent and the sum of components (d) and (e) 1.7 percent of the total weight of the emulsion.

10. Process for producing on fibrous materials a water-repellent dressing resistant to washing, wherein the fibrous material is treated in an aqueous bath obtained by diluting with water an emulsion claimed in claim 9 and adding a hardening catalyst, and in which process the treated material is dried and subjected to a heat treatment.

11. A concentrated aqueous emulsion of the oil-in-water type suitable for the preparation of an aqueous impregnating bath, which emulsion contains in the oily phase (a) a water-insoluble methylated methylol melamine in which the oxygen atom of two methylol groups are esterified with stearic acid and (b) paraffin wax, said emulsion containing in the aqueous phase as emulsifying agents (c) polyvinyl alcohol, (d) sodium-$\mu$-heptadecyl-N-benzyl-benzimidazole-disulfonate and (e) a condensation product from cresol, 2-naphthol-6-sulfonic acid, an alkali sulfite and formaldehyde neutralized with sodium hydroxide, the constituents of said emulsion being present in the relative proportions expressed in parts by weight: aqueous phase to oily phase 66:34, component (a) to component (b) 17:17, component (c) 3.4 percent of the sum of components (d) and (e) 1.7 percent of the total weight of the emulsion.

12. Process for producing on fibrous materials a water-repellent dressing resistant to washing, wherein the fibrous material is treated in an aqueous bath obtained by diluting with water an emulsion claimed in claim 11 and adding a hardening catalyst, and in which process the treated material is dried and subjected to a heat treatment.

13. A concentrated aqueous emulsion of the oil-in-water type suitable for the preparation of an aqueous impregnating bath, which emulsion contains in the oily phase (a) a water-insoluble methylated methylol melamine in which the oxygen atoms of two methylol groups are esterified with stearic acid and (b) paraffin wax, said emulsion containing in the aqueous phase as emulsifying agents (c) polyvinyl alcohol, (d) a condensation product from olein alcohol and ethylene oxide and (e) a condensation product from naphthalene sulfonic acid and formaldehyde neutralized with sodium hydroxide, the constituents of said emulsion being present in the relative proportions expressed in parts by weight: aqueous phase to oily phase 64:36, component (a) to component (b) 18:18, component (c) 3.0 percent and the sum of component (d) and (e) 4.2 percent of the total weight of the emulsion.

14. Process for producing on fibrous materials a water-repellent dressing resistant to washing, wherein the fibrous material is treated in an aqueous bath obtained by diluting with water an emulsion claimed in claim 13 and adding a hardening catalyst, and in which process the treated material is dried and subjected to a heat treatment.

References Cited in the file of this patent

UNITED STATES PATENTS

| | | |
|---|---|---|
| 2,426,770 | Grim | Sept. 2, 1947 |
| 2,586,098 | Schibler | Feb. 19, 1952 |

FOREIGN PATENTS

| | | |
|---|---|---|
| 611,012 | Great Britain | Oct. 25, 1948 |

UNITED STATES PATENT OFFICE

CERTIFICATE OF CORRECTION

Patent No. 2,835,639                May 20, 1958

Gustav Widmer et al.

It is hereby certified that error appears in the printed specification of the above numbered patent requiring correction and that the said Letters Patent should read as corrected below.

Column 2, line 61, for "80:20)." read -- 80:20. --; column 8, line 62, for "percent of" read -- percent and --.

Signed and sealed this 4th day of November 1958.

(SEAL)
Attest:

KARL H. AXLINE
Attesting Officer

ROBERT C. WATSON
Commissioner of Patents